US012742392B2

(12) United States Patent
Vignola et al.

(10) Patent No.: US 12,742,392 B2
(45) Date of Patent: Sep. 22, 2026

(54) GAS TURBINE ENGINE ROTOR STAGE WITH SEALING MEMBERS

(71) Applicant: Pratt & Whitney Canada Corp., Longueuil (CA)

(72) Inventors: Sylvain Vignola, St-Basile Grand (CA); Gabrielle Lamarche, Saint-Roch de Richelieu (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 19/005,541

(22) Filed: Dec. 30, 2024

(65) Prior Publication Data

US 2026/0185448 A1 Jul. 2, 2026

(51) Int. Cl.

| | |
|---|---|
| ***F01D 5/06*** | (2006.01) |
| ***F01D 5/30*** | (2006.01) |
| ***F01D 11/00*** | (2006.01) |
| *F01D 5/22* | (2006.01) |

(52) U.S. Cl.

CPC ............. *F01D 5/06* (2013.01); *F01D 5/3007* (2013.01); *F01D 11/005* (2013.01); *F01D 11/006* (2013.01); *F01D 11/008* (2013.01); *F01D 5/22* (2013.01); *F05D 2220/32* (2013.01); *F05D 2240/55* (2013.01)

(58) Field of Classification Search

CPC ........ F01D 11/006; F01D 11/008; F01D 5/22; F01D 5/3007; F01D 5/10; F05D 2240/57; F05D 2260/96

See application file for complete search history.

(56) References Cited

U.S. PATENT DOCUMENTS

| | | | | |
|---|---|---|---|---|
| 4,029,436 A | 6/1977 | Shoup, Jr. | | |
| 5,513,955 A * | 5/1996 | Barcza | F01D 5/22 | 416/193 A |
| 5,573,375 A * | 11/1996 | Barcza | F01D 11/006 | 416/193 A |
| 5,785,499 A * | 7/1998 | Houston | F01D 5/22 | 416/500 |

(Continued)

FOREIGN PATENT DOCUMENTS

DE 102017218484 A1 * 4/2019 ........... F01D 5/3007

OTHER PUBLICATIONS

DE-102017218484—translation from Espacenet (Year: 2019).*
EP search report for EP25227679.5 dated Jun. 3, 2026.

*Primary Examiner* — Courtney D Heinle
*Assistant Examiner* — Behnoush Haghighian
(74) *Attorney, Agent, or Firm* — Getz Balich LLC

(57) ABSTRACT

A rotor stage for a gas turbine engine is provided that includes first and second rotor blades, a disk, and a seal member. Each rotor blade has an airfoil, an attachment section, a neck section, and a platform. The platform has platform inner and outer radial surfaces. The disk has first and second disk slots that are adjacent one another. In an assembled state, the attachment sections are received in the slots. In the assembled state, the platforms of the first and second rotor blades and the outer radial surface of the disk form at least one slot. The seal member includes a central segment and an axial locator tab. In the assembled state, the central segment is disposed for engagement with the first and second rotor blade platforms, and the axial locator tab is disposed in the slot.

20 Claims, 18 Drawing Sheets

(56) References Cited

U.S. PATENT DOCUMENTS 5,803,710 A * 9/1998 Dietrich ................ F04D 29/668 416/500
5,827,047 A * 10/1998 Gonsor ................. F01D 11/008 416/193 A
5,924,699 A * 7/1999 Airey .................... F01D 11/006 277/411
6,171,058 B1 * 1/2001 Stec .......................... F01D 5/22 416/193 A
6,932,575 B2 * 8/2005 Surace ...................... F01D 5/22 416/193 A
7,121,800 B2 * 10/2006 Beattie ...................... F01D 5/22 416/193 A
7,214,034 B2 * 5/2007 Giot ...................... F01D 5/3015 416/193 A
7,905,709 B2 * 3/2011 Lagrange .............. F01D 5/3007 416/219 R
8,011,892 B2 * 9/2011 Ramlogan ................. F01D 5/22 416/193 A
8,011,894 B2 * 9/2011 Arness .................. F01D 5/3007 416/220 R
8,038,405 B2 * 10/2011 Ward .................... F01D 11/006 416/220 R
8,613,599 B2 12/2013 Lake
8,661,641 B2 * 3/2014 Lecuyer .................. B23P 19/10 29/466
8,985,960 B2 * 3/2015 Connor ................ F16J 15/0887 416/219 R
9,175,570 B2 * 11/2015 Propheter-Hinckley .................... B22F 5/04
9,328,621 B2 * 5/2016 Lecuyer .................. B23P 19/10
9,732,620 B2 * 8/2017 Hough .................. F01D 5/3007
9,810,075 B2 * 11/2017 Lana ..................... F01D 5/3007
9,822,644 B2 * 11/2017 Tardif ................... F01D 5/3007
9,822,658 B2 * 11/2017 Lewis ................... F01D 11/005
9,863,257 B2 * 1/2018 Snyder ................... B33Y 80/00
9,951,625 B2 * 4/2018 Congratel ............. F01D 11/006
9,976,427 B2 * 5/2018 Winn ...................... F01D 5/147
10,001,023 B2 * 6/2018 Lewis ................... F01D 11/008
10,012,085 B2 * 7/2018 Hough ...................... F01D 5/26
10,060,262 B2 * 8/2018 Knowlton ................. F01D 5/22
10,100,648 B2 * 10/2018 Niezelski ................ F16F 15/04
10,113,434 B2 * 10/2018 Snyder ...................... F01D 5/22
10,125,615 B2 * 11/2018 Congratel ................. F01D 5/22
10,247,023 B2 * 4/2019 Beattie ...................... F01D 5/22
10,378,378 B2 * 8/2019 Watanabe ............... F01D 11/00
10,724,386 B2 * 7/2020 Thistle .................. F01D 11/003
10,731,479 B2 8/2020 Thistle
10,907,482 B2 * 2/2021 Snyder .................. F01D 11/006
10,934,864 B2 * 3/2021 Lee ....................... F01D 5/3007
10,934,874 B2 * 3/2021 Sanzari ................... F01D 5/147
11,377,967 B2 * 7/2022 Skidelsky ............. F01D 11/006
11,773,731 B2 * 10/2023 Place ........................ F01D 5/22 415/119
11,808,164 B1 * 11/2023 West ..................... F01D 25/285
2005/0079062 A1 * 4/2005 Surace ...................... F01D 5/22 416/248
2005/0175462 A1 * 8/2005 Lagrange ............. F01D 5/3007 416/219 R
2006/0056974 A1 * 3/2006 Beattie .................. F01D 11/006 416/193 A
2009/0004013 A1 * 1/2009 Ramlogan ............ F01D 11/006 416/190
2013/0195665 A1 * 8/2013 Snyder ...................... F01D 5/22 416/174
2013/0276456 A1 * 10/2013 Propheter-Hinckley .................... F01D 5/22 29/889
2014/0304989 A1 * 10/2014 Lecuyer ................ F01D 25/285 29/889.21
2015/0125301 A1 * 5/2015 Headland .............. F01D 11/006 416/174
2015/0226077 A1 * 8/2015 Beattie ...................... F01D 5/26 416/174
2015/0369048 A1 * 12/2015 Hough ...................... F01D 5/10 29/889.21
2016/0102557 A1 * 4/2016 Knowlton ................. F01D 5/10 416/144
2016/0123153 A1 * 5/2016 Congratel ............ F01D 5/3007 416/182
2016/0153303 A1 * 6/2016 Hough .................. F01D 5/3007 416/193 A
2016/0222798 A1 * 8/2016 Snyder ...................... F01D 5/22
2016/0251963 A1 * 9/2016 Tardif ................... F01D 5/3007 416/219 R
2016/0273367 A1 * 9/2016 Lana ..................... F01D 11/006
2017/0145848 A1 * 5/2017 Lewis ................... F01D 11/006
2017/0159457 A1 * 6/2017 Niezelski ............. F01D 5/3007
2017/0284221 A1 * 10/2017 Watanabe ............... F01D 25/08
2017/0362951 A1 * 12/2017 Lewis .................... F16J 15/162
2019/0010810 A1 * 1/2019 Snyder .................. F01D 11/006
2020/0248576 A1 * 8/2020 Sanzari ................... F01D 5/147
2021/0172324 A1 * 6/2021 Skidelsky ................. F01D 5/22
2023/0212950 A1 * 7/2023 Place ........................ F01D 5/16 415/119

* cited by examiner

GAS TURBINE ENGINE ROTOR STAGE WITH SEALING MEMBERS

BACKGROUND OF THE INVENTION

1. Technical Field

The present disclosure relates to gas turbine engines in general, and to rotor stage rotor blade platform sealing members in particular.

2. Background Information

Gas turbine engines, such as those that power modern commercial and military aircraft, generally include a compressor to pressurize an airflow, a combustor to combust a fuel, and a turbine to extract energy from the resultant combustion gases. The turbine section typically includes a plurality of rotor stages and stator vane stages. Each rotor stage includes a plurality of rotor blades attached to a disk. The rotor blades are circumferentially distributed and extend radially out from the disk. Each rotor blade includes an attachment section (sometimes referred to as the "root"), a neck section, a platform, and an airfoil. The attachment section of each rotor blade is configured for mating engagement with a slot disposed within the disk. The neck section extends between the attachment section and the airfoil. The airfoil includes a suction side, a pressure side, a leading edge, and a trailing edge. The platform extends laterally outward from the neck section on the suction and pressure sides, and outwardly from the axially forward end of the neck section and outwardly from the axially aft end of the neck section. An outer radial surface of the platform is contiguous with the airfoil.

When the rotor blades are all mounted within the disk, a gap is disposed between the platforms of adjacent rotor blades. A seal member (sometimes referred to as a "feather seal") is disposed at the gap to prevent or impede air flow through the gap. The seal members often have a configuration that makes it difficult to assemble the rotor stage. In some existing designs, once the seal member is in place it cannot readily be seen by the technician assembling the rotor stage. It would be beneficial to have a seal member that provides desirable sealing and one that facilitates assembly.

SUMMARY

According to an aspect of the present disclosure, a rotor stage for a gas turbine engine is provided that includes a first rotor blade, a second rotor blade, a disk, and a seal member. The first rotor blade (FRB) has an FRB airfoil, an FRB attachment section, an FRB neck section, and an FRB platform. The FRB neck section extends between the FRB attachment section and the FRB airfoil. The FRB platform extends laterally outward from the FRB neck section. The FRB platform has an FRB platform inner radial surface and an FRB platform outer radial surface. The second rotor blade (SRB) having an SRB airfoil, an SRB attachment section, an SRB neck section, and an SRB platform. The SRB neck section extends between the SRB attachment section and the SRB airfoil. The SRB platform extends laterally outward from the SRB neck section. The SRB platform has an SRB platform inner radial surface and an SRB platform outer radial surface. The disk is configured for rotation about a rotational axis. The disk has a forward axial end surface, an aft axial end surface, an outer radial surface that extends between the forward axial end surface and the aft axial end surface, a first slot configured to receive the FRB attachment section, and a second slot configured to receive the SRB attachment section. The first slot and the second slot are circumferentially adjacent one another. The rotor stage is configurable in an assembled state. In the assembled state, the FRB attachment section is fully received in the first slot, and the SRB attachment section is fully received in the second slot. In the assembled state, the FRB platform, the SRB platform, and the outer radial surface of the disk form at least one slot. The seal member includes a central segment and an axial locator tab. In the assembled state, the central segment is disposed for engagement with the FRB platform inner radial surface and the SRB platform, and the axial locator tab is disposed in the at least one slot.

In any of the aspects or embodiments described above and herein, in the assembled state the axial locator tab may be visible within the at least one slot, the at least one slot and the axial locator tab may have mating configurations, the axial locator tab may be visible in the at least one slot at the forward axial end of the disk, and/or the axial locator tab may be visible in the at least one slot at the aft axial end surface of the disk.

In any of the aspects or embodiments described above and herein, the seal member may include an aft segment, and the axial locator tab may be disposed at a forward end of the central segment and aft segment may be disposed at an aft end of the central segment, and the outer radial surface of the disk may include a tab surface that mates with a surface of the axial locator tab.

In any of the aspects or embodiments described above and herein, the FRB platform may include an FRB platform tab slot, and in the assembled state, at least a portion of the axial locator tab may be received within the FRB platform tab slot.

In any of the aspects or embodiments described above and herein, the SRB platform may include an SRB platform tab slot, and in the assembled state, at least a portion of the axial locator tab may be received within the SRB platform tab slot.

In any of the aspects or embodiments described above and herein, the axial locator tab is visible in the at least one slot at the forward axial end of the disk.

In any of the aspects or embodiments described above and herein, the seal member may include a forward segment, and the axial locator tab may be disposed at an aft end of the central segment and forward segment is disposed at a forward end of the central segment, and the outer radial surface of the disk may include a tab surface that mates with a surface of the axial locator tab.

In any of the aspects or embodiments described above and herein, the FRB platform may include an FRB platform tab channel, and in the assembled state, at least a portion of the axial locator tab may be received within the FRB platform tab channel, and the FRB platform tab channel may form a portion of the at least one slot.

In any of the aspects or embodiments described above and herein, the SRB platform may include an SRB platform tab channel, and in the assembled state, at least a portion of the axial locator tab may be received within the SRB platform tab channel, and the SRB platform tab channel may form a portion of the at least one slot.

In any of the aspects or embodiments described above and herein, the axial locator tab may be a forward axial locator tab disposed at a forward end of the central segment, and the seal member further may include an aft axial locator tab disposed at an aft end of the central segment, and the at least one slot may include a forward slot and an aft slot, and in the assembled state, the forward slot may be contiguous with the forward axial end surface, and the aft slot may be contiguous with the aft axial end surface.

In any of the aspects or embodiments described above and herein, the outer radial surface of the disk may include a forward tab surface that mates with a surface of the forward axial locator tab, and an aft tab surface that mates with a surface of the aft axial locator tab.

In any of the aspects or embodiments described above and herein, the FRB platform may include a forward FRB platform tab channel, and in the assembled state, at least a portion of the forward axial locator tab may be received within the forward FRB platform tab channel, and the SRB platform may include a forward SRB platform tab channel, and at least a portion of the forward axial locator tab may be received within the forward SRB platform tab channel, and the forward FRB platform tab channel and the forward SRB platform tab channel may form a portion of the forward slot.

In any of the aspects or embodiments described above and herein, the FRB platform may include an aft FRB platform tab channel, and in the assembled state, at least a portion of the aft axial locator tab may be received within the aft FRB platform tab channel, and the SRB platform may include an aft SRB platform tab channel, and in the assembled state, at least a portion of the aft axial locator tab may be received within the aft SRB platform tab channel, and the aft FRB platform tab channel and the aft SRB platform tab channel may form a portion of the aft slot.

In any of the aspects or embodiments described above and herein, the FRB platform may have an FRB platform lateral edge surface, and the SRB platform may have an SRB platform lateral edge surface, and the FRB platform lateral edge surface and the SRB platform lateral edge surface may be adjacent one another and spaced apart from one another by a gap, and the central segment of the seal member extends across the gap in the assembled state.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
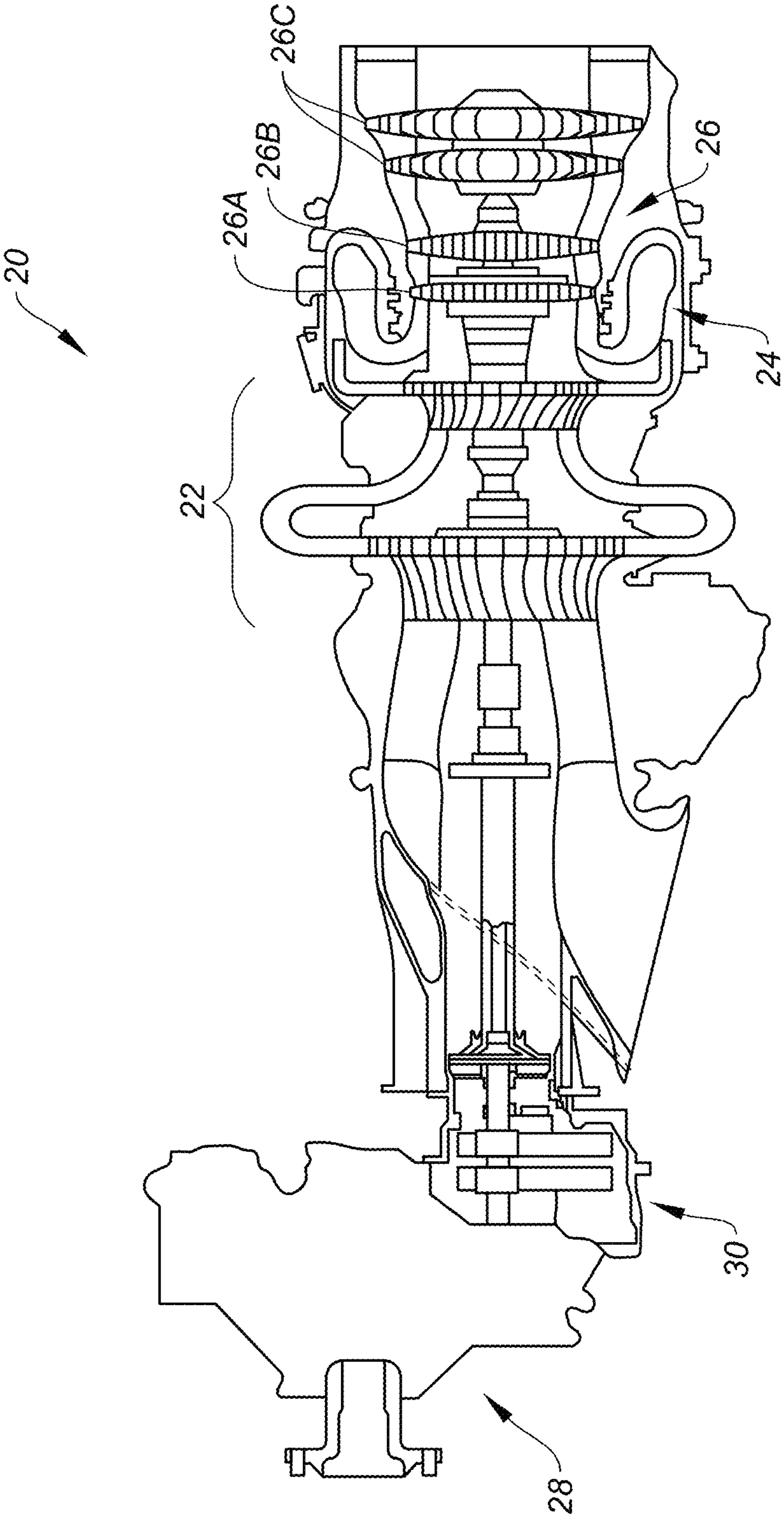
FIG. 1 is a diagrammatic illustration of a gas turbine engine that may utilize embodiments of the present disclosure.

FIG. 1 diagrammatically illustrates a thermal engine in the form of a gas turbine engine 20 that includes a compressor section 22, a combustion section 24, and a turbine section 26. A propulsion unit 28 is shown connected to the gas turbine engine 20 by a reduction gear box 30. Air enters the engine 20 and is worked to a higher pressure and temperature within the compressor section 22. The worked air enters the combustion section 24 and is mixed with fuel and is combusted. The combustion products and any residual air enters the turbine section 26 and drives one or more turbine rotor stages 26A, 26B, 26C. The turbine rotor stages 26A, 26B, 26C, in turn, power the compressor section 22 and the propulsion unit 28. The air (and combustion products in the turbine section 26) follow a gas path that may be referred to as the "core gas path". The present disclosure is not limited to any particular gas turbine engine configuration, and may be used with other thermal engine types including an internal combustion engine.

Figure 2:
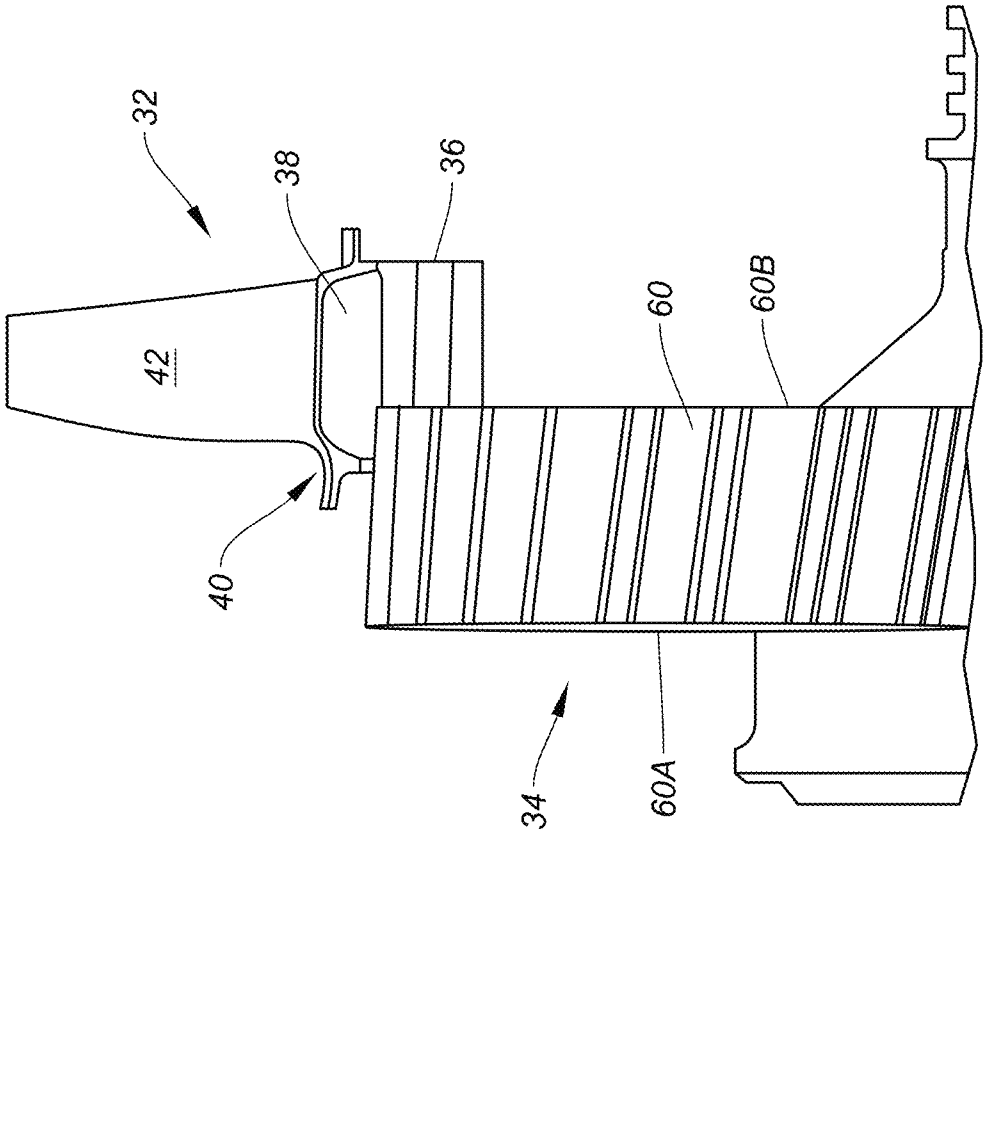
FIG. 2 is diagrammatic representation of a turbine rotor stage disk and a rotor blade.

The gas turbine engine 20 shown diagrammatically in FIG. 1 includes a high pressure turbine rotor stage 26A, a low pressure turbine rotor stage 26B, and a pair of power turbine rotor stages 26C. Each rotor stage 26A, 26B, 26C includes a plurality of rotor blades 32 (e.g., see FIG. 3) attached to a disk 34. The rotor blades 32 are circumferentially distributed around the disk 34 and extend radially out from the disk 34. FIG. 2 diagrammatically illustrates a rotor blade 32 engaging with the disk 34 of a rotor stage.

The terms "forward", "leading", "aft, and "trailing" are used herein to indicate the relative position of a component or surface. As core gas air passes through the gas turbine engine 20, a "leading edge" of a stator vane or rotor blade 32 encounters core gas air before the "trailing edge" of the same. In an engine 20 like that shown in FIG. 1, the compressor section 22 is "forward" of the turbine section 26 and the turbine section 26 is "aft" of the compressor section 22. The terms "upstream" and "downstream" used herein refer to the direction of a gas flow passing through an annular gas path of the gas turbine engine 20. It should also be noted that the terms "radial" and "circumferential" are used herein with respect to the rotational axis of the gas turbine engine 20.

Figure 3:
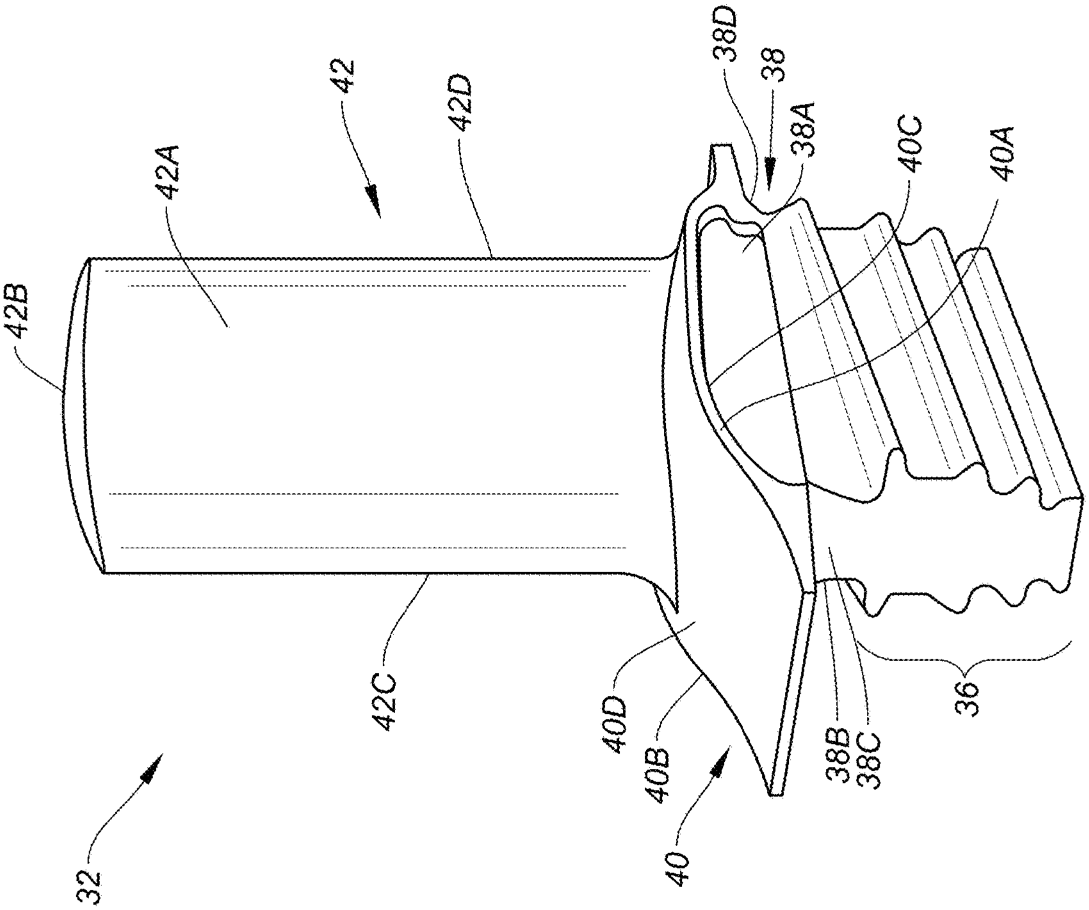
FIG. 3 is a diagrammatic illustration of a rotor blade embodiment.
Figure 4:
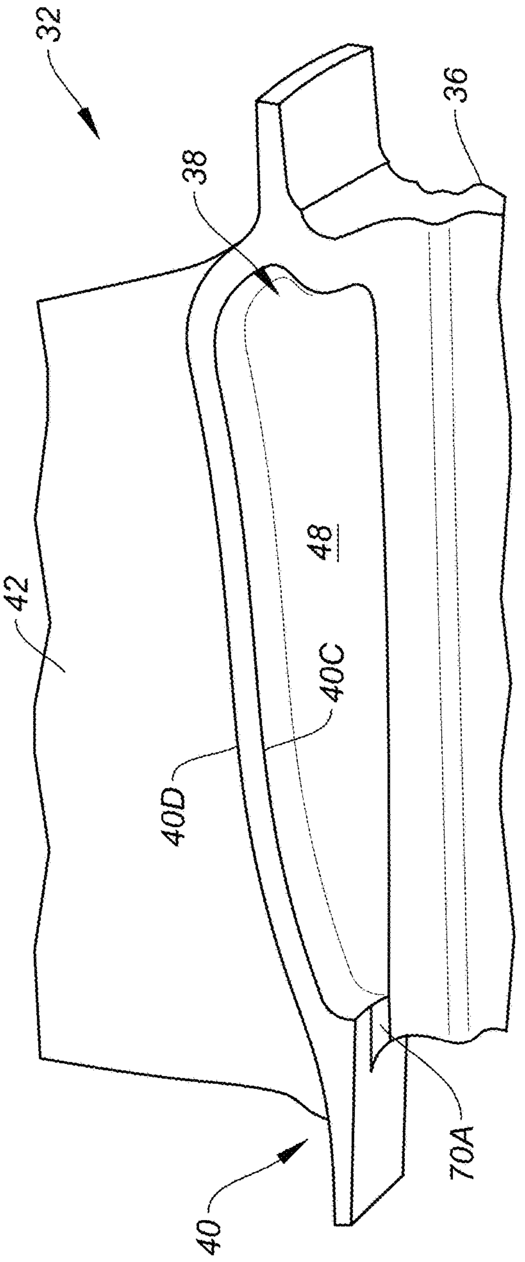
FIG. 4 is a diagrammatic partial view of a rotor blade embodiment shown from the pressure side.
Figure 4A:
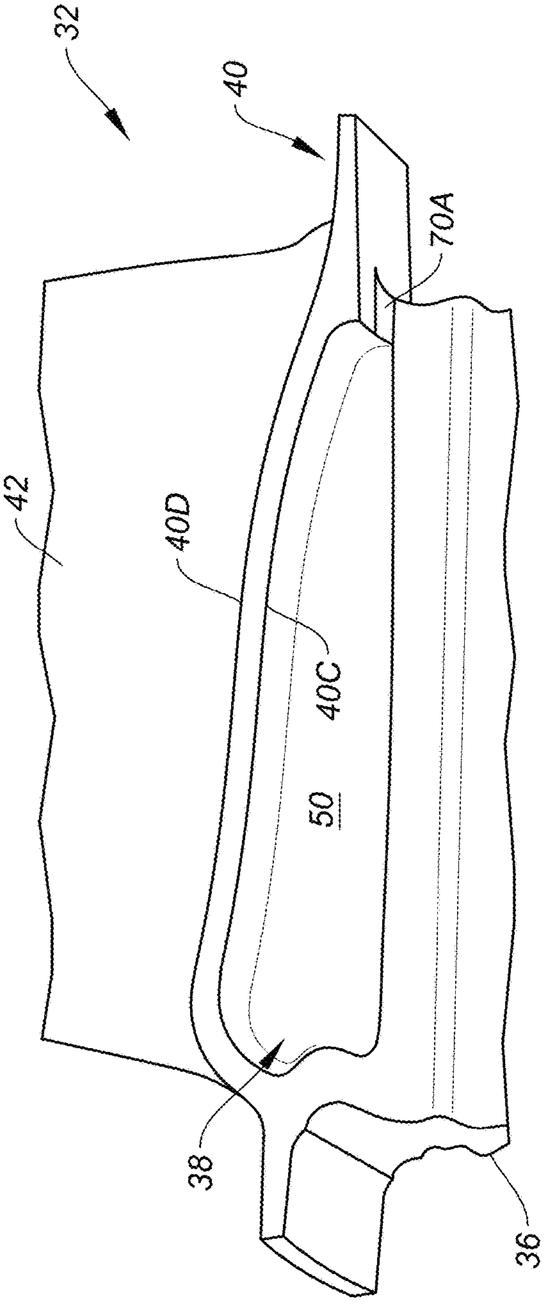
FIG. 4A is a diagrammatic partial view of a rotor blade embodiment shown from the suction side.
Figure 5:
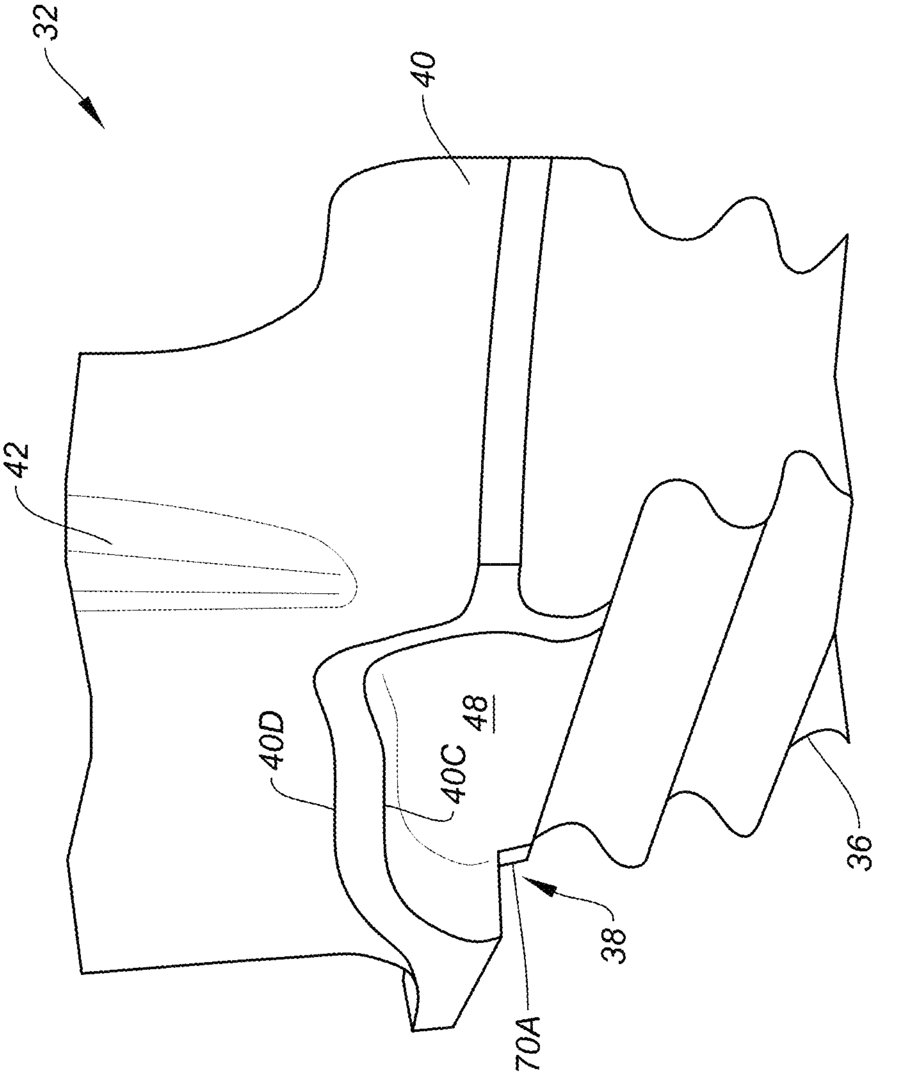
FIG. 5 is a diagrammatic partial perspective view of the rotor blade embodiment shown in FIGS. 4 and 4A.
Figure 6:
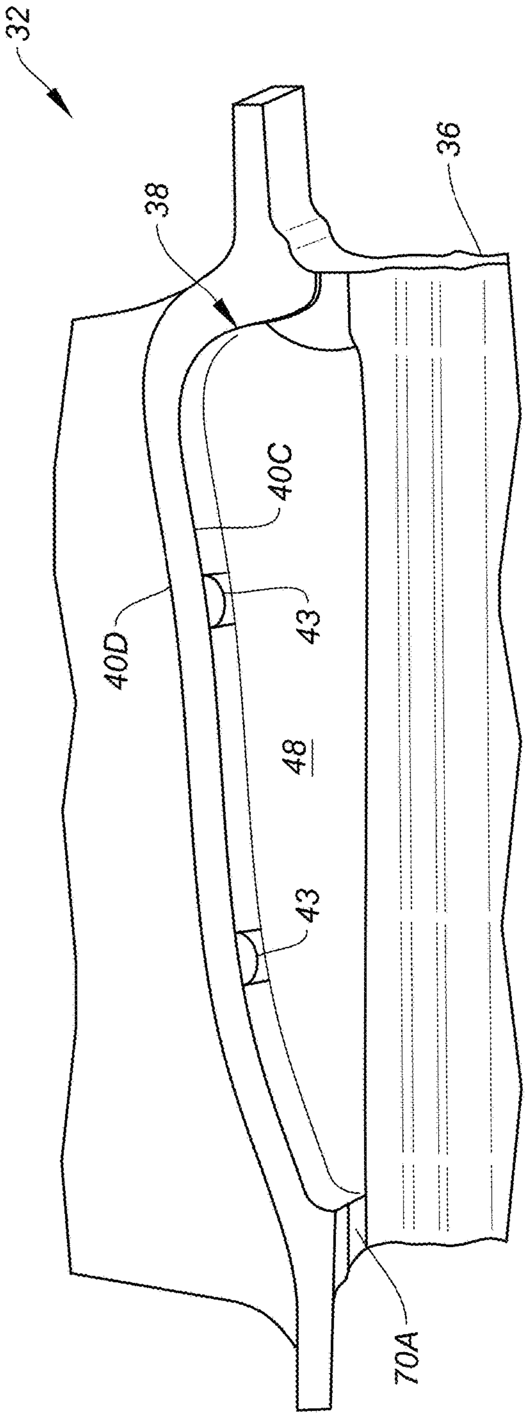
FIG. 6 is a diagrammatic partial view of a rotor blade embodiment shown from the pressure side.
Figure 6A:
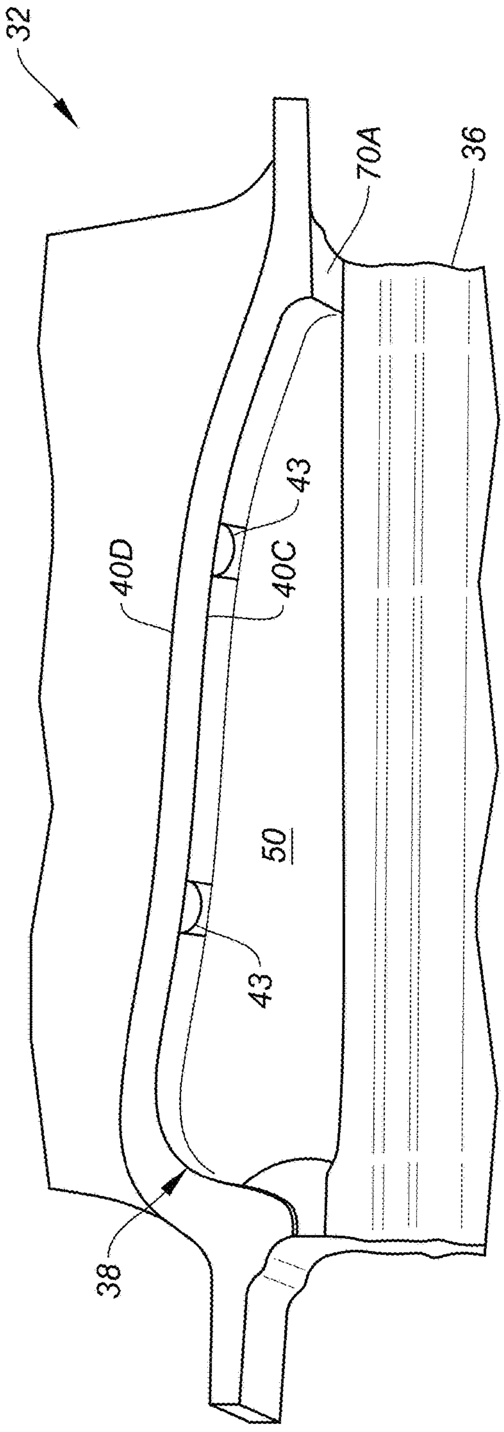
FIG. 6A is a diagrammatic partial view of a rotor blade embodiment shown from the suction side.

Referring to FIG. 3, each rotor blade 32 includes an attachment section 36 (sometimes referred to as the "root"), a neck section 38, a platform 40, and an airfoil 42. The attachment section 36 of each rotor blade 32 is configured for mating engagement with a respective slot 44 disposed within the disk 34 (e.g., see FIG. 2). The neck section 38 extends between the attachment section 36 and the airfoil 42. The neck section 38 may be described as having a pressure side 38A (disposed on the same side of the rotor blade 32 as the pressure side of the airfoil 42), a suction side 38B (disposed on the same side of the rotor blade 32 as the suction side of the airfoil 42), an axially forward end 38C, and an axially aft end 38D. The airfoil 42 includes a pressure side 42A, a suction side 42B, a leading edge 42C, and a trailing edge 42D. The platform 40 extends laterally outward from the neck section 38 on the suction and pressure sides to a respective platform lateral edge surface 40A, 40B, and axially outwardly from the forward end and axially outwardly from the aft end of the neck section 38. The platform 40 includes an inner radial surface 40C and an outer radial surface 40D. The outer radial surface 40D of the platform 40 is contiguous with the airfoil 42. As will be detailed herein, the inner radial surface 40C and a portion of the neck section 38 are configured to receive a seal member 46. More specifically and referring to FIGS. 4-6, in some embodiments the pressure side of the neck section 38 may include a pressure side (PS) cavity 48, or the suction side of the neck section 38 may include a suction side (SS) cavity 50, or the neck section 38 may include both a PS cavity 48 and a SS cavity 50. FIG. 4 illustrates a PS cavity 48 of a present disclosure rotor blade 32 embodiment and FIG. 4A illustrates a SS cavity 50 of the same rotor blade 32 embodiment. FIG. 5 is a diagrammatic perspective view of the embodiment shown in FIGS. 4 and 4A, diagrammatically shows the PS cavity 48 embodiment shown in FIGS. 4 and 4A in a perspective view looking in a direction generally aft to forward. FIG. 6 illustrates a PS cavity 48 of another present disclosure rotor blade 32 embodiment and FIG. 6A illustrates a SS cavity 50 of the rotor blade 32 embodiment shown in FIG. 6. In some embodiments, a present disclosure rotor blade 32 may be configured to engage with a seal member 46 having a forward axial locator tab 46A, or a seal member 46 with an aft axial locator tab 46E, or a seal member 46 with both a forward axial locator tab 46A and an aft axial locator tab 46E. The rotor blade 32 embodiments shown in FIGS. 4, 4A, 6, and 6A are described in greater detail herein.

Figure 6B:
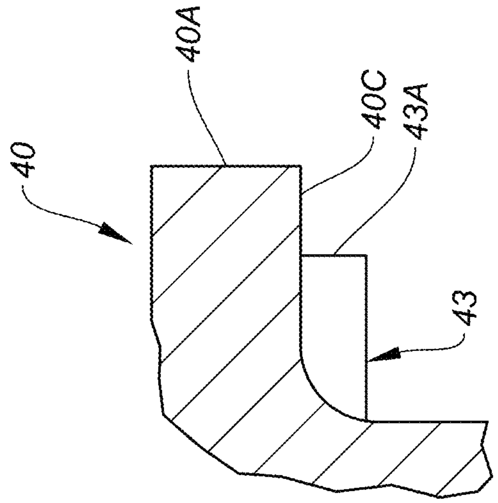
FIG. 6B is a diagrammatic view of a rotor blade embodiment having a seal member bumper.

In some embodiments, a rotor blade 32 may include one or more features (e.g., "bumpers 43") extending out from the inner radial surface 40C of the platform. The bumpers 43 may include an end surface 43A. FIG. 6B diagrammatically illustrates an example of a bumper 43 having an end surface 43A spaced apart from the platform lateral edge surface 40A. The bumpers 43 are configured to limit the travel of the seal member 46 (described below) in a circumferential direction; e.g., a lateral edge of the seal member 46 will contact the bumper 43 and the bumper 43 will thereby limit the circumferential travel of the seal member 46. Rotor blade embodiments may include bumpers 43 on both the pressure side of the rotor blade 32 or the suction side of the rotor blade 32. The present disclosure does not require the rotor blades 32 to include bumpers 43.

Aspects of the present disclosure include a rotor stage 26A, 26B, 26C that includes a seal member 46 disposed between adjacent rotor blades 32 within the rotor stage 26A, 26B, 26C. The seal member 46 impedes or prevents migration of high temperature core gas passing through the core gas path between the platforms 40 of adjacent rotor blades 32 within the rotor stage 26A, 26B, 26C. The rotor blade platforms 40 define an inner radial boundary of the core gas path and the rotor blades 32 are disposed in the core gas path. The present disclosure may be used with different rotor stages 26A, 26B, 26C within the gas turbine engine 20 including any of the high pressure turbine rotor stage 26A, the low pressure turbine rotor stage 26B, or the power turbine rotor stages 26C shown in FIG. 1.

FIGS. 7-10A diagrammatically illustrate present disclosure seal member 46 embodiments. The seal member 46 embodiment diagrammatically shown in FIGS. 7 and 7A includes a forward axial locator tab 46A, a central segment 46B, and an aft segment 46C. The seal member 46 shown in FIG. 7 has a rectangular cross-sectional geometry throughout the forward axial locator tab 46A, the central segment 46B and the aft segment 46C; e.g., see FIG. 7A.

Figures 7, 7A, 8, 8A:
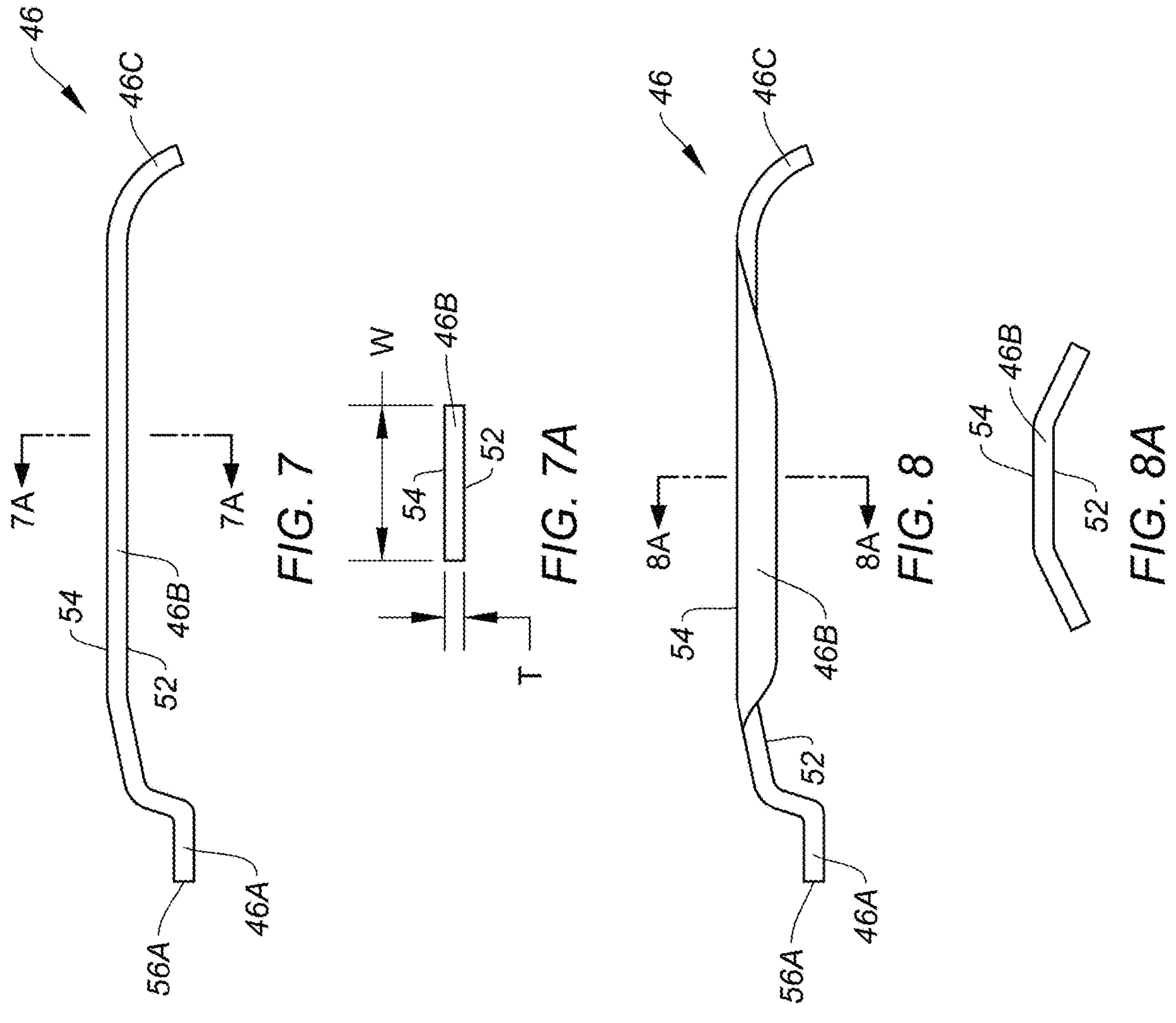
FIG. 7 is a diagrammatic illustration of a present disclosure seal member embodiment.
FIG. 7A is a sectional view of the seal member embodiment shown in FIG. 7 along sectional line 7A-7A shown in FIG. 7.
FIG. 8 is a diagrammatic illustration of a present disclosure seal member embodiment.
FIG. 8A is a sectional view of the seal member embodiment shown in FIG. 8 along sectional line 8A-8A shown in FIG. 8.

The seal member 46 embodiment diagrammatically shown in FIGS. 8 and 8A includes a forward axial locator tab 46A, a central segment 46B, and an aft segment 46C. The seal member 46 diagrammatically shown in FIG. 8 has a non-planar cross-sectional geometry (e.g., a generally U-shaped cross-sectional geometry-see FIG. 8A) within the central segment 46B and has a rectangular cross-sectional geometry in the forward axial locator tab 46A.

Figure 9:
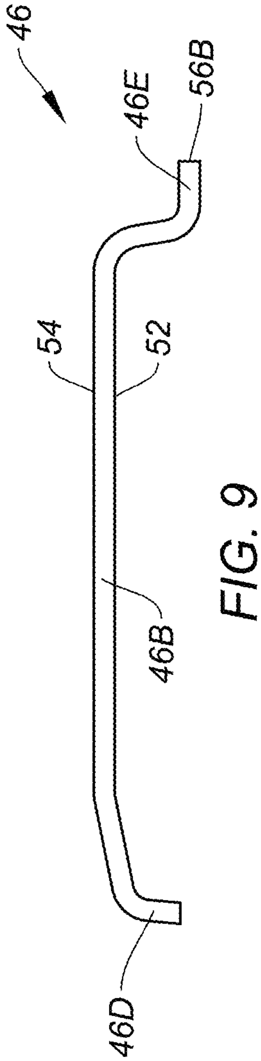
FIG. 9 is a diagrammatic illustration of a present disclosure seal member embodiment.
Figure 9A:
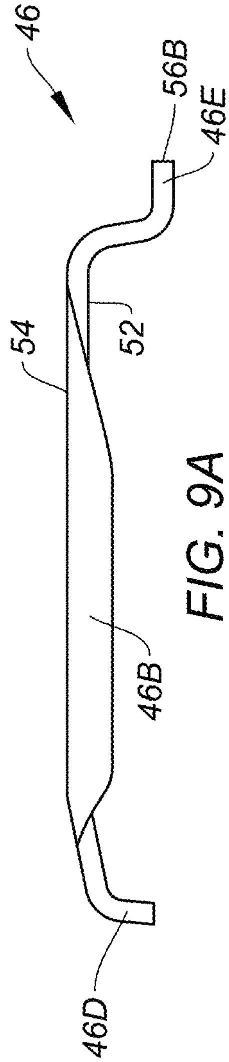
FIG. 9A is a diagrammatic illustration of a present disclosure seal member embodiment.

The seal member 46 embodiments diagrammatically shown in FIGS. 9 and 9A include a forward segment 46D, a central segment 46B, and an aft axial locator tab 46E. The seal member 46 shown in FIG. 9 has a rectangular cross-sectional geometry throughout the forward segment 46D, the central segment 46B, and the aft axial locator tab 46E. The seal member 46 diagrammatically shown in FIG. 9A has a non-planar cross-sectional geometry (e.g., see FIG. 8A) within the central segment 46B and has a rectangular cross-sectional geometry in the aft axial locator tab 46E.

Figure 10:
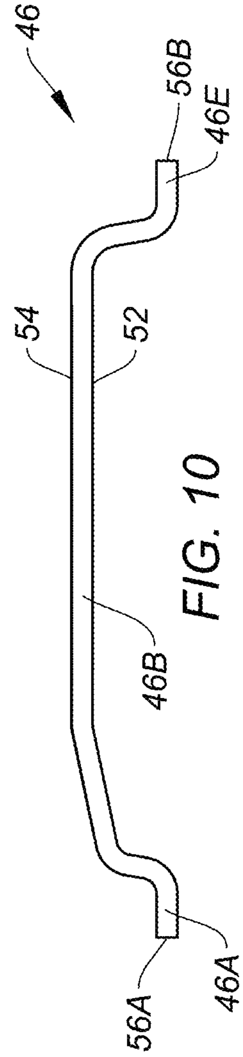
FIG. 10 is a diagrammatic illustration of a present disclosure seal member embodiment.
Figure 10A:
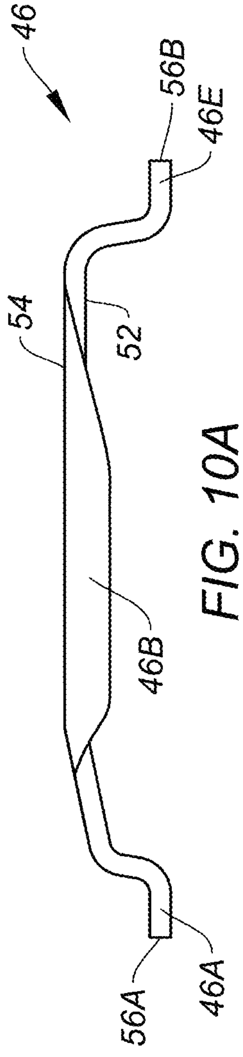
FIG. 10A is a diagrammatic illustration of a present disclosure seal member embodiment.

The seal member 46 embodiments diagrammatically shown in FIGS. 10 and 10A include a forward axial locator tab 46A, a central segment 46B, and an aft axial locator tab 46E. The seal member 46 shown in FIG. 10 has a rectangular cross-sectional geometry throughout the forward axial locator tab 46A, the central segment 46B, and the aft axial locator tab 46E. The seal member 46 diagrammatically shown in FIG. 10A has a non-planar cross-sectional geometry (e.g., see FIG. 8A) within the central segment 46B and has a rectangular cross-sectional geometry in the forward axial locator tab 46A and the aft axial locator tab 46E. The "non-planar" cross-sectional geometry may be any shape that is a near net surface of the blade surfaces that will be engaged by the seal member 46.

The elements of the seal member 46 embodiments shown in FIGS. 7-10A (e.g., the forward axial locator tab 46A, the forward segment 46D, the central segment 46B, the aft segment 46C, or the aft axial locator tab 46E, or any combination thereof) may each be described as having an inner radial surface 52 and an outer radial surface 54. The thickness ("T") of each seal member element extends between the inner and outer radial surfaces 52, 54 of the respective seal member element. The seal member elements (e.g., the forward axial locator tab 46A, the forward segment 46D, the central segment 46B, the aft segment 46C, or the aft axial locator, or any combination thereof) may each be described as having a width ("W") that extends between lateral side edges of the respective element. The width of each seal member element is substantially greater than its thickness (W>>T). The forward axial locator tab 46A may be described as having a distal end surface 56A, and the aft axial locator tab 46E may be described as having a distal end surface 56B.

The seal member 46 embodiments diagrammatically shown in FIGS. 7-10A are provided to illustrate examples of a present disclosure seal member 46 having a forward axial locator tab 46A (with no aft axial locator tab 46E), a seal member 46 having an aft axial locator tab 46E (with no forward axial locator tab 46A), and a seal member 46 having both a forward axial locator tab 46A and an aft axial locator tab 46E. As will be detailed herein, the disk inter-slot segments 62 and the seal member 46 embodiments are configured to allow the forward axial locator tab 46A and/or the aft axial locator tab 46E to be inserted with the rotor blades 32 into the disk; e.g., these elements provide sufficient clearance to allow assembly of the rotor stage. The present disclosure is not limited to these seal member 46 examples. The present disclosure is also not limited to any particular cross-sectional geometry; i.e., the rectangular cross-sectional geometry shown in FIG. 7A and the non-planar cross-sectional geometry shown in FIG. 8A are provided to illustrate different cross-sectional geometries.

The present disclosure seal members 46 are configured to substantially mate with surfaces of each rotor blade 32 of a pair of adjacent rotor blades 32 to provide sealing of the gap 58 (e.g., see FIGS. 17, 17A, 18, 18A) between the adjacent platforms 40 of the adjacent rotor blades 32; e.g., the seal members 46 are configured to mate with a portion of the inner radial surface 40C of a blade platform 40, or with surfaces of the PS cavity 48 or the SS cavity 50, or the like, or any combination thereof. As will be detailed herein, elements of the present disclosure seal members 46 (e.g., the forward axial locator tab 46A, the aft axial locator tab 46E) are also configured to mate with surfaces of the disk 34.

Figure 11:
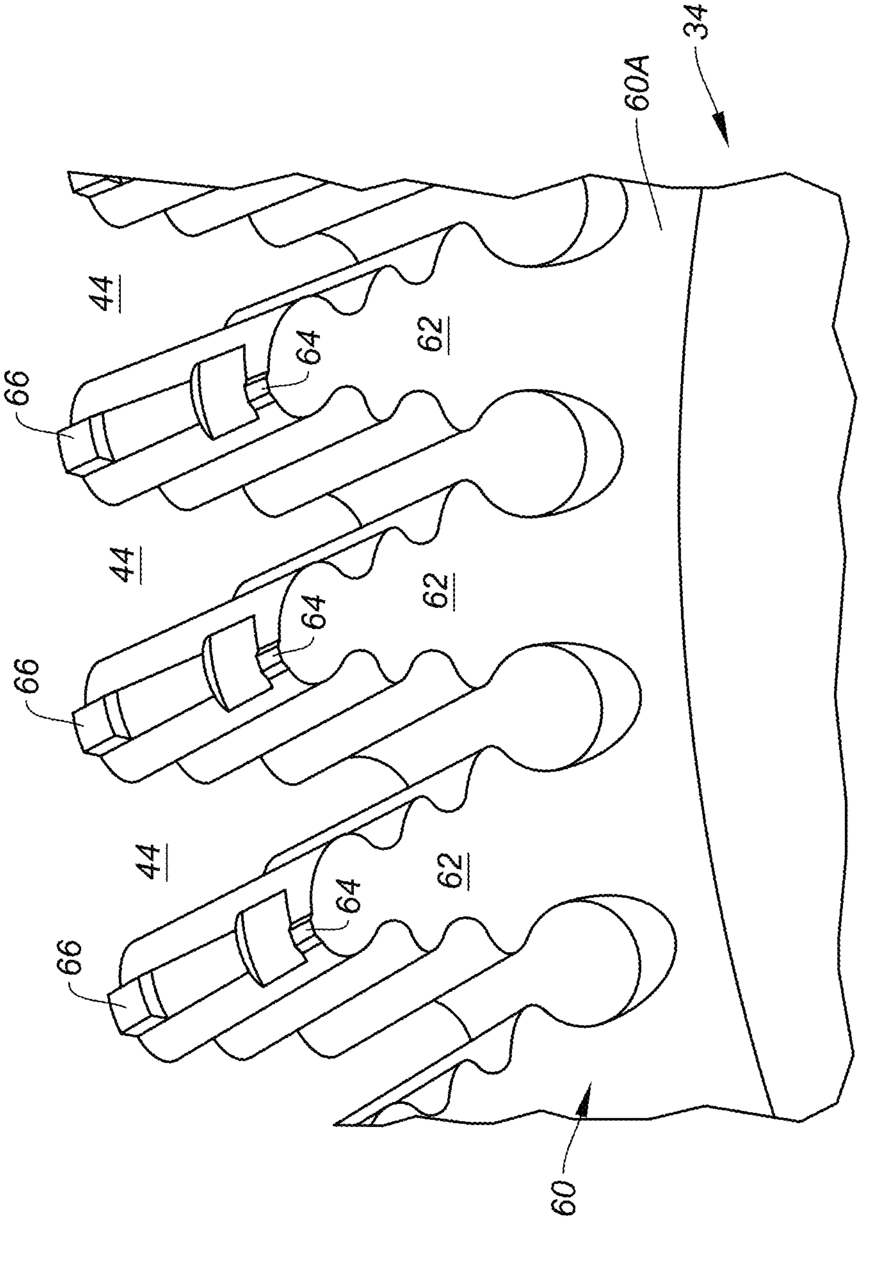
FIG. 11 is a diagrammatic partial view of a present disclosure rotor stage disk embodiment.
Figure 11B:
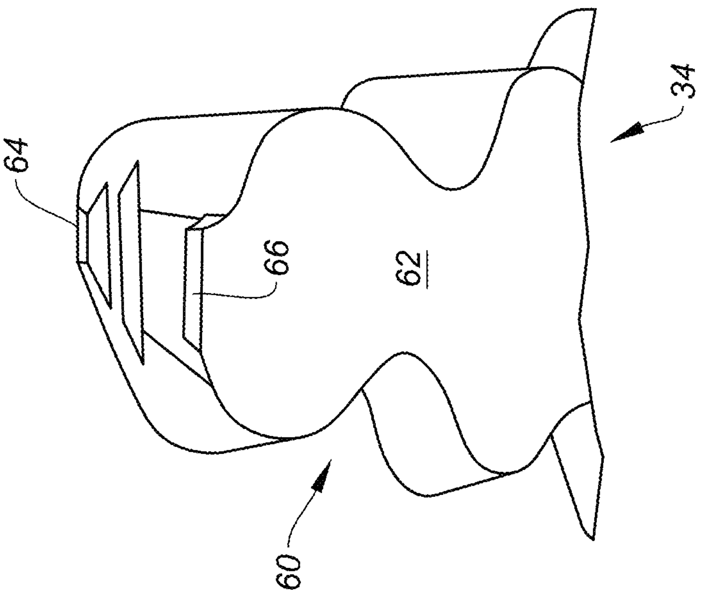
FIG. 11B is an enlarged view of a portion of the rotor stage disk embodiment shown in FIG. 11.
Figure 11A:
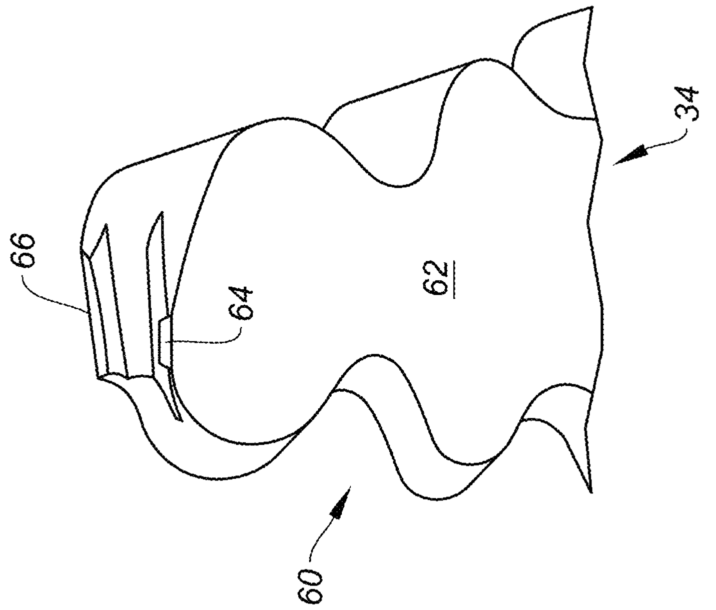
FIG. 11A is an enlarged view of a portion of the rotor stage disk embodiment shown in FIG. 11.

FIG. 11 diagrammatically illustrates a portion of a disk 34, showing a plurality of slots 44 disposed in the rim 60 of the disk 34. As disclosed herein, each slot 44 has a geometric configuration that mates with the attachment section 36 (e.g., the "root") of a rotor blade 32. In the embodiment shown in FIG. 11, the slots 44 have a multi-groove configuration often referred to as a "fir tree" configuration, but that is not required. The outer radial portion of the disk rim 60 disposed between adjacent slots 44 may be referred to as an inter-slot segment 62 that extends between a surface disposed at a forward end 60A of the disk rim 60 and a surface disposed an aft end 60B of the disk rim 60. In those present disclosure embodiments that include a seal member 46 that includes a forward axial locator tab 46A, the inter-slot segment 62 includes a forward tab mating surface 64 disposed contiguous with the forward end 60A of the disk rim 60. In those present disclosure embodiments that include a seal member 46 that includes an aft axial locator tab 46E, the inter-slot segment 62 includes an aft tab mating surface 66 disposed contiguous with the aft end 60B of the disk rim 60. The disk 34 embodiment shown in FIG. 11, includes inter-slot segments 62 that include both a forward tab mating surface 64 and an aft tab mating surface 66. FIG. 11A illustrates in enlarged fashion a disk rim 60 portion disposed between a pair of slots 44, showing an inter-slot segment 62 having both a forward tab mating surface 64 and an aft tab mating surface 66 in a view direction from forward to aft. FIG. 11B illustrates the same disk rim 60 portion in a view direction from aft to forward. As indicated above and detailed herein, the disk inter-slot segments 62 and the seal member 46 embodiments are configured to allow the forward axial locator tab 46A and/or the aft axial locator tab 46E to be inserted with the rotor blades 32 into the disk; e.g., these elements provide sufficient clearance to allow assembly of the rotor stage.

As will be detailed herein, the forward tab mating surface 64 is configured to mate generally with the respective forward axial locator tab 46A of a seal member 46, and the aft tab mating surface 66 is configured to mate generally with the respective aft axial locator tab 46E of a seal member 46. The phrase "mate generally" is used to refer to the forward and/or aft tab mating surface 64, 66 being configured to be a one of a plurality of surfaces that collectively form a slot 68 (e.g., see FIGS. 17, 17A, 18, 18A) that receives a forward axial locator tab 46A or an aft axial locator tab 46E.

FIGS. 12-16 diagrammatically illustrate a rotor blade 32 mounted within a disk 34 and a seal member 46 engaged with the rotor blade 32 and the disk 34.

Figure 12:
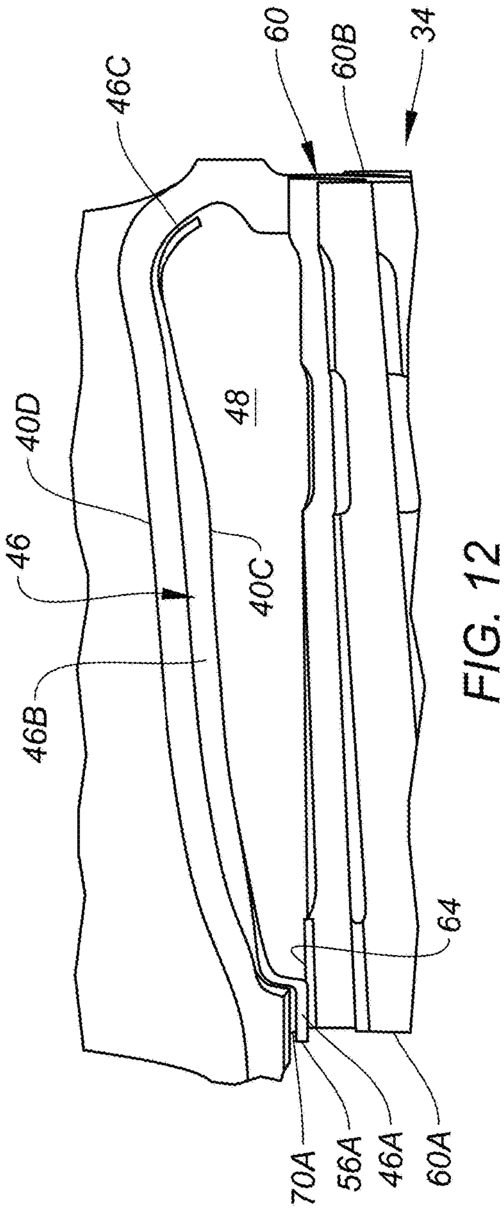
FIG. 12 is a diagrammatic planar view of a present disclosure seal member embodiment engaged with a rotor blade and disk.
Figure 13:
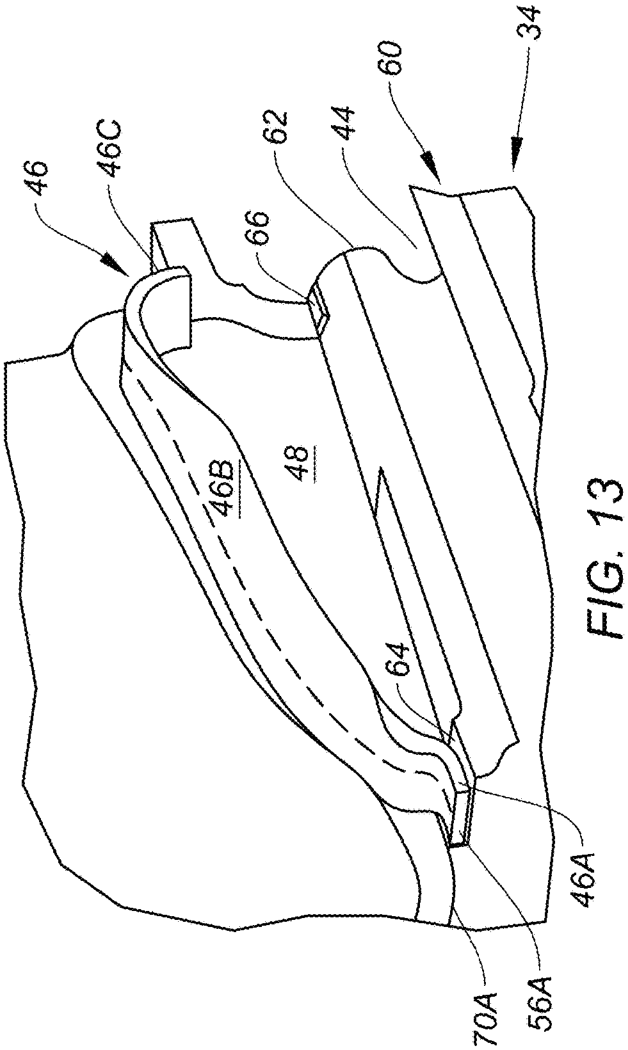
FIG. 13 is a diagrammatic perspective view of the present disclosure seal member embodiment shown in FIG. 12 engaged with a rotor blade and disk.

In the embodiment shown in FIGS. 12 and 13, the seal member 46 includes a forward axial locator tab 46A, a central segment 46B, and an aft segment 46C. A portion of the seal member 46 width is shown engaged with the rotor blade 32, and more specifically the outer radial surface 54 of the central segment 46B and the aft segment 46C are engaged with a portion of the inner radial surface 40C of the platform 40 that extends into the PS cavity 48 disposed in the neck section 38. The forward axial locator tab 46A is disposed within a slot 68 disposed between a portion of the inner radial surface 40C of the rotor blade platform 40 and the forward tab mating surface 64 of the inter-slot segment 62 of the disk 34. In some embodiments, the inner radial surface 40C of the rotor blade platform 40 may include a platform channel (e.g., a forward platform tab channel 70A) configured to receive a portion of the forward axial locator tab 46A; e.g., see FIGS. 17, 18. The perspective view shown in FIG. 13 illustrates an embodiment wherein the lengthwise extent of the seal member 46 is configured to engage with platform inner radial surfaces 40C of both adjacent rotor blades 32.

Figure 14:
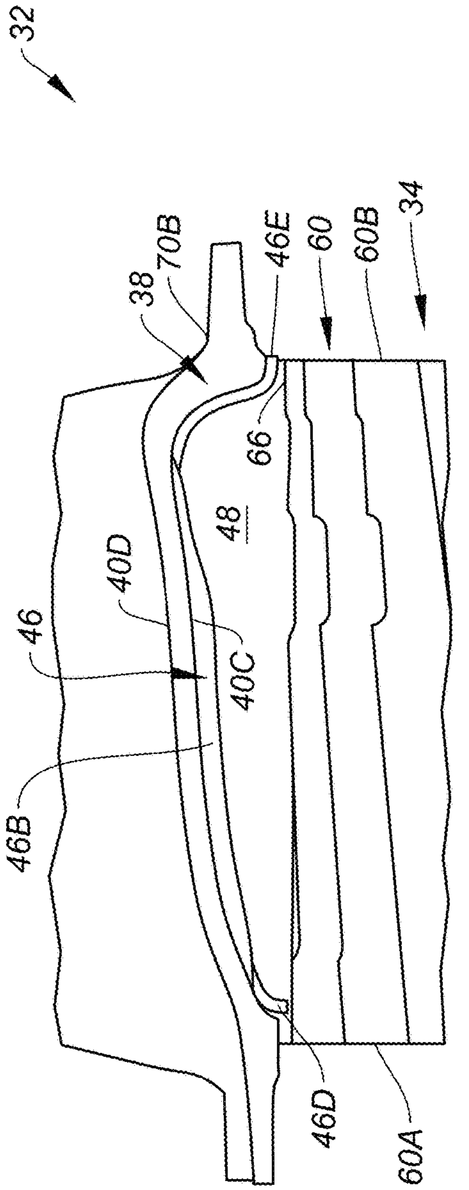
FIG. 14 is a diagrammatic planar view of a present disclosure seal member embodiment engaged with a rotor blade and disk.

In the embodiment shown in FIG. 14, the seal member 46 includes a forward segment 46D, a central segment 46B, and an aft axial locator tab 46E. A portion of the seal member 46 width is shown engaged with the rotor blade 32, and more specifically the outer radial surface 54 of the central segment 46B and the forward segment 46D are engaged with a portion of the inner radial surface 40C of the blade platform 40 that extends into the PS cavity 48 disposed in the neck section 38. The aft axial locator tab 46E is disposed within a slot 68 (e.g., see FIGS. 17A, 18A) disposed between a portion of the inner radial surface 40C of the rotor blade platform 40 and the aft tab mating surface 66 of the inter-slot segment 62 of the disk 34. In some embodiments, the inner radial surface 40C of the rotor blade platform 40 may include a platform channel (e.g., an aft platform tab channel 70B) configured to receive a portion of the aft axial locator tab 46E.

Figure 15:
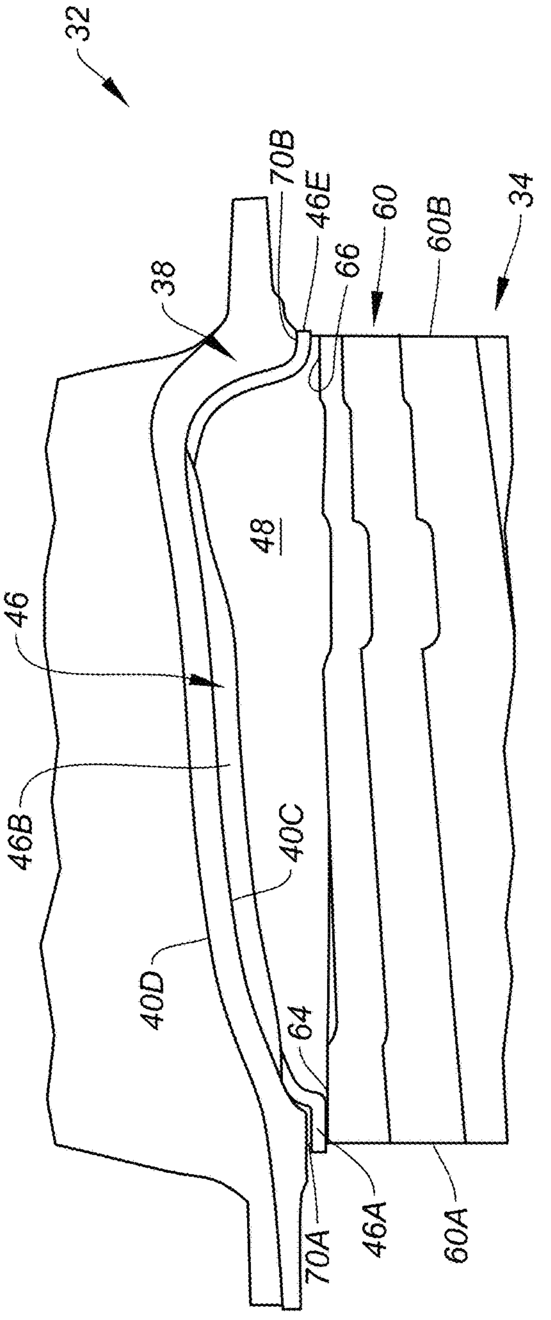
FIG. 15 is a diagrammatic planar view of a present disclosure seal member embodiment engaged with a rotor blade and disk.
Figure 16:
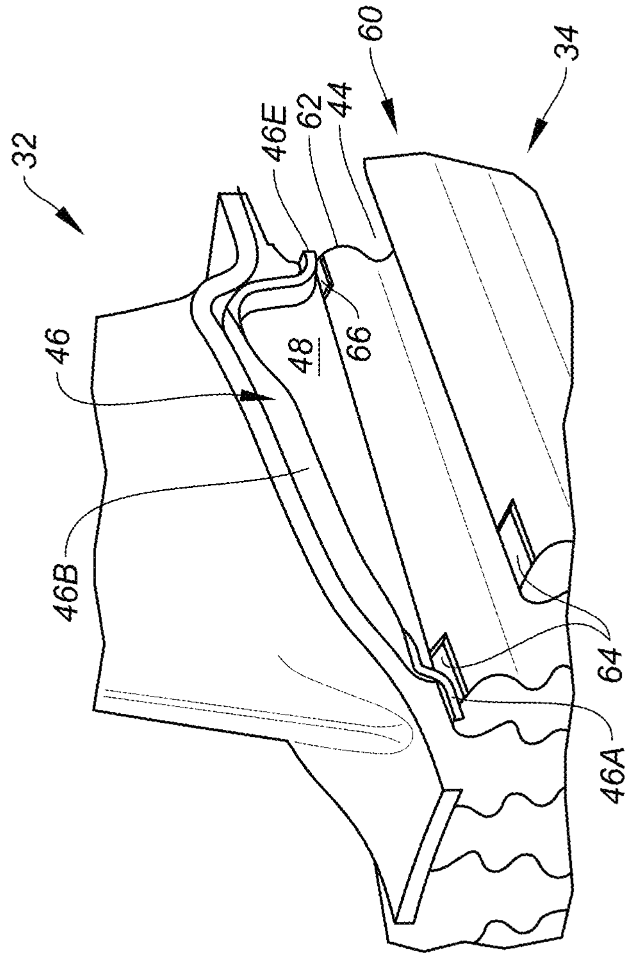
FIG. 16 is a diagrammatic perspective view of the present disclosure seal member embodiment shown in FIG. 15 engaged with a rotor blade and disk.

In the embodiment shown in FIGS. 15 and 16, the seal member 46 includes a forward axial locator tab 46A, a central segment 46B, and an aft axial locator tab 46E. A portion of the seal member 46 width (e.g., the central segment 46B) is shown engaged with the rotor blade 32. The forward axial locator tab 46A is disposed within a slot 68 (e.g., see FIGS. 17, 18) disposed between a portion of the inner radial surface 40C of the rotor blade platform 40 and the forward tab mating surface 64 of the inter-slot segment 62 of the disk 34. The aft axial locator tab 46E is disposed within a slot 68 disposed between a portion of the inner radial surface 40C of the rotor blade platform 40 and the aft tab mating surface 66 of the inter-slot segment 62 of the disk 34; e.g., see FIGS. 17A, 18A. As detailed above, in some embodiments, the inner radial surface 40C of the rotor blade platform 40 may include a platform channel (e.g., forward tab channel 70A) configured to receive a portion of the forward axial locator tab 46A and a platform channel (e.g., aft tab channel 70B) configured to receive a portion of the aft axial locator tab 46E.

Figure 17:
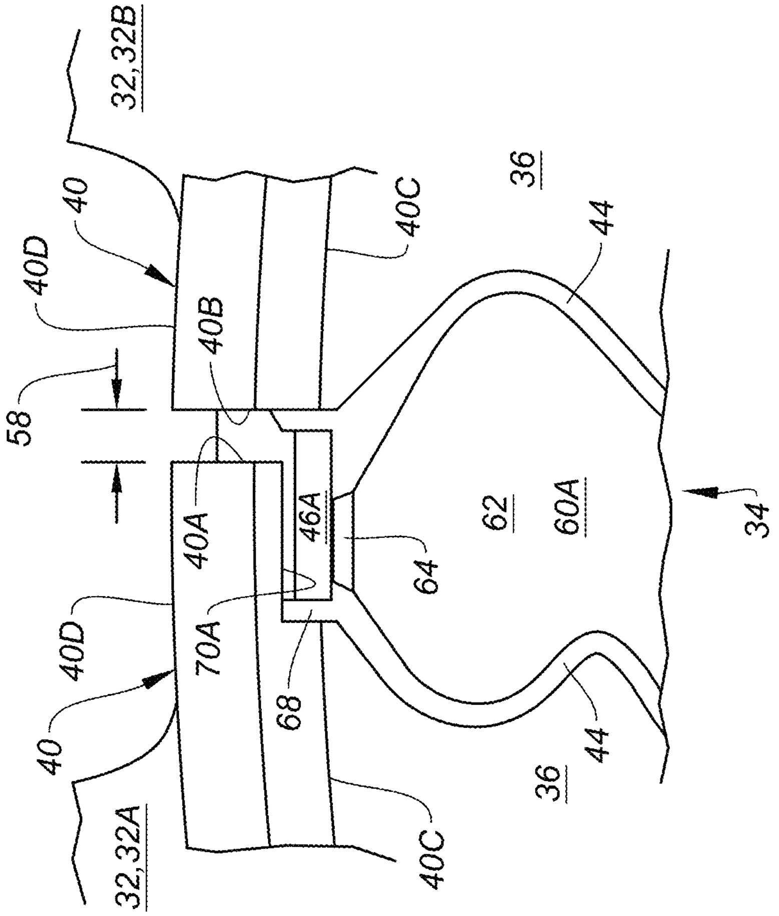
FIG. 17 is a diagrammatic illustration of a present disclosure seal member embodiment engaged with a pair of adjacent rotor blades and a disk viewed from a forward end of the disk.
Figure 17A:
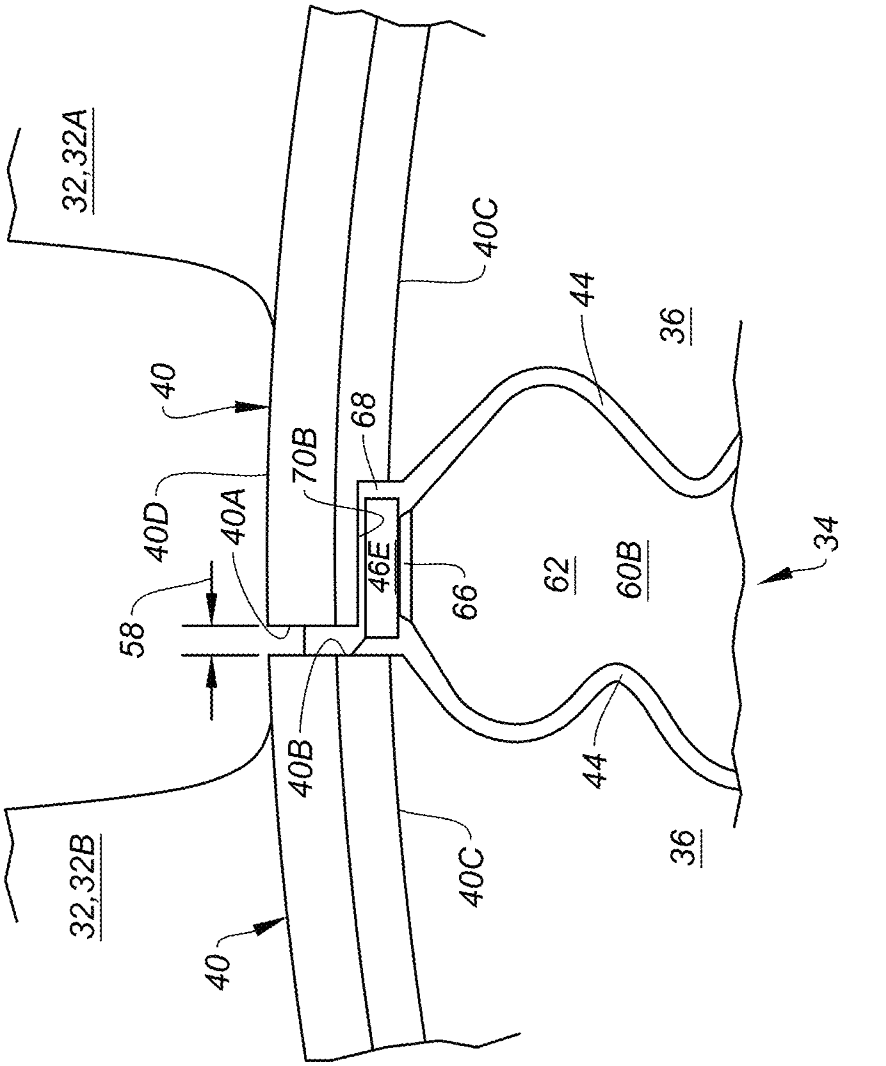
FIG. 17A is a diagrammatic illustration of the seal member embodiment shown in FIG. 17, viewed from an aft end of the disk.
Figure 18:
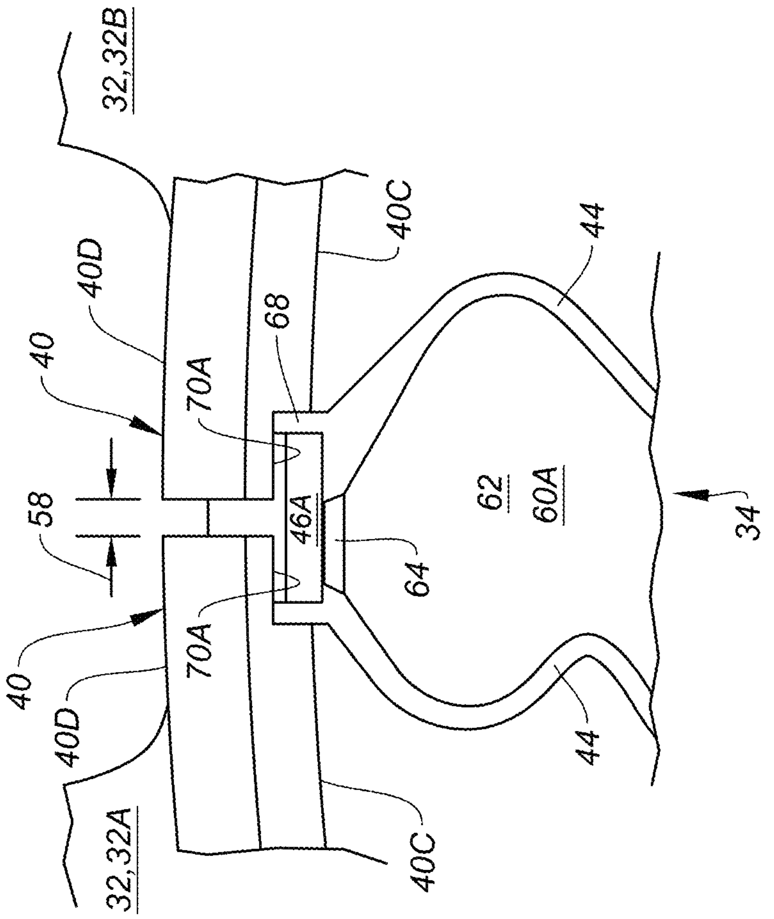
FIG. 18 is a diagrammatic illustration of a present disclosure seal member embodiment engaged with a pair of adjacent rotor blades and a disk viewed from a forward end of the disk.
Figure 18A:
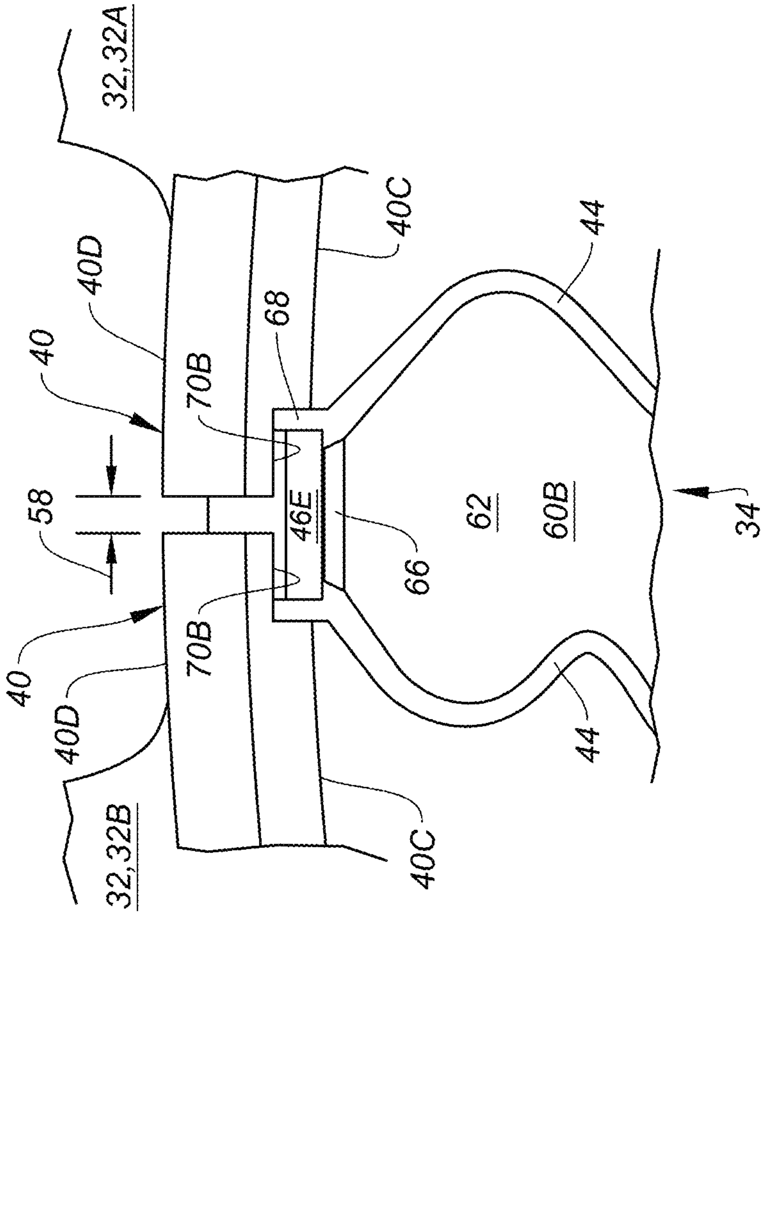
FIG. 18A is a diagrammatic illustration of the seal member embodiment shown in FIG. 18, viewed from an aft end of the disk.

FIG. 17 diagrammatically illustrates a view from the forward end 60A of the disk inter-slot segment 62. In this view, the forward axial locator tab 46A is shown disposed in a slot 68 formed by the platform tab channel 70A disposed in the inner radial surface 40C of one of the adjacent rotor blades 32 (i.e., the rotor blade 32A on the left), the platform lateral edge surface 40B of the other of the adjacent rotor blades 32 (i.e., the rotor blade 32B on the right), and the forward tab mating surface 64 of the inter-slot segment 62. The forward axial locator tab 46A may engage with the rotor blade 32B by abutting with the platform lateral edge surface 40B. FIG. 17A diagrammatically illustrates a view from the aft end 60B of the disk inter-slot segment 62. In this view, the aft axial locator tab 46E is shown disposed in a slot 68 formed by the platform tab channel 70B disposed in the inner radial surface 40C of one of the adjacent rotor blades 32 (i.e., the rotor blade 32A on the right), the platform lateral edge surface 40B of the other of the adjacent rotor blades 32 (i.e., the rotor blade 32B on the left), and the forward aft mating surface 66 of the inter-slot segment 62. The aft axial locator tab 46E may engage with the rotor blade 32B by abutting with the platform lateral edge surface 40B. FIG. 18 diagrammatically illustrates a view from the forward end 60A of the disk inter-slot segment 62. In this view, the forward axial locator tab 46A is shown disposed in a slot 68 formed by the platform tab channel 70A disposed in the inner radial surface 40C of one of the adjacent rotor blades 32 (i.e., the rotor blade 32A on the left), the platform tab channel 70A disposed in the inner radial surface 40C of the other adjacent rotor blades 32 (i.e., the rotor blade 32B on the right), and the forward tab mating surface 64 of the inter-slot segment 62. FIG. 18A diagrammatically illustrates a view from the aft end 60B of the disk inter-slot segment 62. In this view, the aft axial locator tab 46E is shown disposed in a slot 68 formed by the platform tab channel 70A disposed in the inner radial surface 40C of one of the adjacent rotor blades 32 (i.e., the rotor blade 32A on the right), the platform tab channel 70A disposed in the inner radial surface 40C of the other adjacent rotor blades 32 (i.e., the rotor blade 32B on the left), and the aft tab mating surface 66 of the inter-slot segment 62.

During assembly of the rotor stage, it is common for the rotor blades 32 to be axially slid into engagement with the disk 34 from the axial end of the disk 34, with the rotor blades 32 being moved axially forward relative to the disk 34. For example, all of the rotor blades 32 may be engaged with the disk 34 from the aft end 60B of the disk rim 60 by a limited amount; e.g., about ten percent of the axial length of the rotor blade neck sections 38. During this initial disk 34 engagement process, each respective seal member 46 is disposed between a respective adjacent pair of rotor blades 32. In those present disclosure embodiments wherein the seal members 46 include a forward axial locator tab 46A, the forward axial locator tab 46A can be seen when the rotor stage is viewed in a direction from the forward end towards the aft end. Hence, the forward axial locator tabs 46A provide an indication to the technician assembling the rotor stage that the seal members 46 are properly positioned. As indicated above, the outer radial surfaces of the disk inter-slot segments 62 and the seal member 46 embodiments are configured to allow the forward axial locator tab 46A and/or the aft axial locator tab 46E to be inserted with the rotor blades 32 into the disk; e.g., these elements provide sufficient clearance to allow assembly of the rotor stage. The assembly process may continue by translating the rotor blades 32 and seal members 46 axially forward relative to the disk rim 60 until the attachment sections 36 of the rotor blades 32 are fully engaged with the slots 44 of the disk 34. When the rotor stage is fully assembled, the forward axial locator tabs 46A can be seen when the rotor assembly is viewed in a direction from the forward end toward the aft end, and the forward axial locator tabs 46A provide an indication that the seal members 46 are properly positioned. In those embodiments wherein the present disclosure seal members 46 include aft axial locator tabs 46E (e.g., only an aft axial locator tab 46E or both forward and aft axial locators tabs 46A, 46E), the aft axial locator tabs 46E can be seen when the rotor assembly is viewed in a direction from the aft end toward the forward end. Hence, the aft axial locator tabs 46E also provide an indication that the seal members 46 are properly positioned. The configurations of the present disclosure seal members 46 (i.e., having a forward and/or aft axial locator tab 46A, 46E), and the configurations of the rotor blades 32 and disks 34 to provide the slots 68 for receiving the forward or aft axial locator tab 46A, 46E, thereby positioning the tabs 46A, 46E for visual inspection, is understood to greatly facilitate rotor stage assembly, and to decrease the chance that a seal member 46 is improperly located within the rotor stage.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted is a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A rotor stage for a gas turbine engine, comprising:

a first rotor blade (FRB) having an FRB airfoil, an FRB attachment section, an FRB neck section, and an FRB platform, wherein the FRB neck section extends between the FRB attachment section and the FRB airfoil, and wherein the FRB platform extends laterally outward from the FRB neck section, and wherein the FRB platform has an FRB platform inner radial surface and an FRB platform outer radial surface;

a second rotor blade (SRB) having an SRB airfoil, an SRB attachment section, an SRB neck section, and an SRB platform, wherein the SRB neck section extends between the SRB attachment section and the SRB airfoil, and wherein the SRB platform extends laterally outward from the SRB neck section, and wherein the SRB platform has an SRB platform inner radial surface and an SRB platform outer radial surface;

a disk configured for rotation about a rotational axis, the disk having a forward axial end surface, an aft axial end surface, an outer radial surface that extends between the forward axial end surface and the aft axial end surface, a first disk slot configured to receive the FRB attachment section, and a second disk slot configured to receive the SRB attachment section, wherein the first disk slot and the second disk slot are circumferentially adjacent one another;

wherein the rotor stage is configurable in an assembled state and in the assembled state the FRB attachment section is fully received in the first disk slot, and the SRB attachment section is fully received in the second disk slot, and in the assembled state the FRB platform, the SRB platform, and the outer radial surface of the disk form at least one slot; and a seal member that includes a central segment and an axial locator tab, wherein in the assembled state, the central segment is disposed for engagement with the FRB platform inner radial surface and the SRB platform, and the axial locator tab is disposed in the at least one slot;

wherein the outer radial surface of the disk includes at least one tab surface; and wherein in the assembled state, the axial locator tab mates with a tab surface of the at least one tab surface of the outer radial surface of the disk.

2. The rotor stage of claim 1, wherein in the assembled state, the axial locator tab is visible within the at least one slot.

3. The rotor stage of claim 2, wherein in the assembled state, the at least one slot and the axial locator tab having mating configurations.

4. The rotor stage of claim 1, wherein the seal member further includes an aft segment, and the axial locator tab is disposed at a forward end of the central segment and aft segment is disposed at an aft end of the central segment.

5. The rotor stage of claim 4, wherein the outer radial surface of the disk includes a tab surface that mates with a surface of the axial locator tab.

6. The rotor stage of claim 5, wherein the FRB platform includes an FRB platform tab slot, and in the assembled state, at least a portion of the axial locator tab is received within the FRB platform tab slot.

7. The rotor stage of claim 6, wherein the SRB platform includes an SRB platform tab slot, and in the assembled state, at least a portion of the axial locator tab is received within the SRB platform tab slot.

8. The rotor stage of claim 7, wherein in the assembled state, the axial locator tab is visible in the at least one slot at the forward axial end of the disk.

9. The rotor stage of claim 1, wherein the seal member further includes a forward segment, and the axial locator tab is disposed at an aft end of the central segment and forward segment is disposed at a forward end of the central segment.

10. The rotor stage of claim 1, wherein the outer radial surface of the disk includes a tab surface that mates with a surface of the axial locator tab.

11. The rotor stage of claim 10, wherein the FRB platform includes an FRB platform tab channel, and in the assembled state, at least a portion of the axial locator tab is received within the FRB platform tab channel, and the FRB platform tab channel forms a portion of the at least one slot.

12. The rotor stage of claim 11, wherein the SRB platform includes an SRB platform tab channel, and in the assembled state, at least a portion of the axial locator tab is received within the SRB platform tab channel, and the SRB platform tab channel forms a portion of the at least one slot.

13. The rotor stage of claim 12, wherein in the assembled state, the axial locator tab is visible in the at least one slot at the aft axial end surface of the disk.

14. The rotor stage of claim 1, wherein the axial locator tab is a forward axial locator tab disposed at a forward end of the central segment, and the seal member further includes an aft axial locator tab disposed at an aft end of the central segment.

15. The rotor stage of claim 14, wherein the at least one slot includes a forward slot and an aft slot;

wherein in the assembled state, the forward slot is contiguous with the forward axial end surface, and the aft slot is contiguous with the aft axial end surface.

16. The rotor stage of claim 15, wherein the at least one tab surface of the outer radial surface of the disk includes a forward tab surface that mates with a surface of the forward axial locator tab, and an aft tab surface that mates with a surface of the aft axial locator tab.

17. The rotor stage of claim 16, wherein the FRB platform includes a forward FRB platform tab channel, and in the assembled state, at least a portion of the forward axial locator tab is received within the forward FRB platform tab channel, and the SRB platform includes a forward SRB platform tab channel, and in the assembled state, at least a portion of the forward axial locator tab is received within the forward SRB platform tab channel, and the forward FRB platform tab channel and the forward SRB platform tab channel form a portion of the forward slot.

18. The rotor stage of claim 17, wherein the FRB platform includes an aft FRB platform tab channel, and in the assembled state, at least a portion of the aft axial locator tab is received within the aft FRB platform tab channel, and the SRB platform includes an aft SRB platform tab channel, and in the assembled state, at least a portion of the aft axial locator tab is received within the aft SRB platform tab channel, and the aft FRB platform tab channel and the aft SRB platform tab channel form a portion of the aft slot.

19. The rotor stage of claim 18, wherein in the assembled state, the forward axial locator tab is visible at the forward axial end surface of the disk within the forward slot, and the aft axial locator tab is visible at the aft axial end surface of the disk within the aft slot.

20. The rotor stage of claim 19, wherein the FRB platform has an FRB platform lateral edge surface, and the SRB platform has an SRB platform lateral edge surface, and the FRB platform lateral edge surface and the SRB platform lateral edge surface are adjacent one another and spaced apart from one another by a gap, and the central segment of the seal member extends across the gap in the assembled state.

* * * * *